H. F. Sharr,
Wood Molding Machine.

N° 61,573.            Patented Jan. 29, 1867.

Witnesses:
Frank G. Parker
William Edson

Inventor:
Henry F. Sharr

United States Patent Office.

HENRY F. SHAW, OF WEST ROXBURY, MASSACHUSETTS.

Letters Patent No. 61,573, dated January 29, 1867.

---

IMPROVEMENT IN PLANING MACHINES.

---

The Schedule referred to in these Letters Patent and making part of the same.

---

TO ALL WHOM IT MAY CONCERN:

Be it known that I, HENRY F. SHAW, of West Roxbury, in the county of Norfolk, and State of Massachusetts, have invented a new and useful Improvement in a Moulding Machine for Irregular Forms; and I do hereby declare that the following is a full and exact description thereof, reference being had to the accompanying drawings and the letters of reference marked thereon.

The nature of my invention consists in so arranging the arbor and hangings of a moulding machine that the arbor may be turned, while the machine is working, end for end, said arbor having cutting knives at each end.

To enable others skilled in the art to make and use my invention, I will proceed to describe its construction and use.

Figure 2:
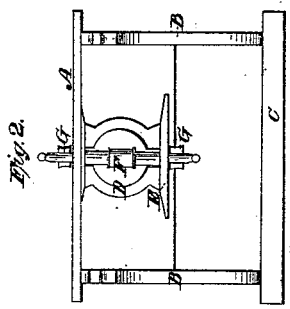
Figure 4:
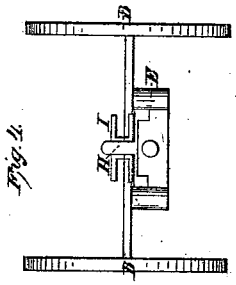
Figure 1:
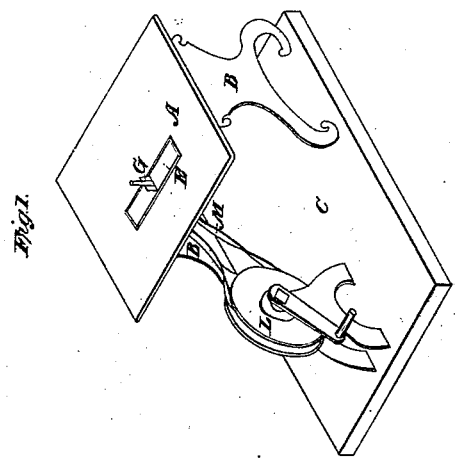
Figure 3:
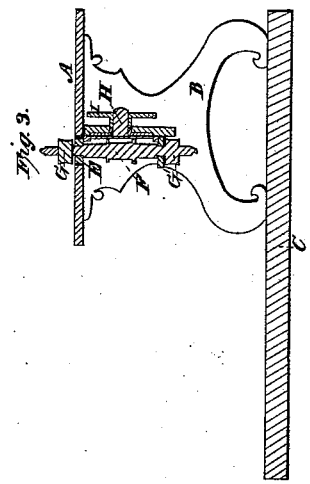

Figure 1 is an isometric view of my moulding machine.
Figure 2 is an elevation of the back side.
Figure 3 is a longitudinal section of the same.
Figure 4 is a horizontal section.

C represents a platform or floor, upon which the moulding machine is erected. B are two standards, upon the top of which the table A is made fast. Attached to the under side of A and to the inside surfaces of the standards B B is a cross-piece or beam K, (figs. 2, 3, and 4.) A disk, having two flat faces E E, and turning upon the pivot H, is affixed to cross-piece K. Upon this disk the journal F is made fast. Near the points where the two cutters G G are inserted in the ends of the journal it passes through the faces E E of the disk. Either of the faces E E of the disk may be made to coincide with the surface of the table A. I (figs. 3 and 4) is a milled-edge button, attached to the disk E E for the purpose of turning the same when it is desirable to reverse the cutter G G. A spring-top (not shown in the drawings) serves to hold the disk in either desired position. The cutters G G are driven by the belt M, (fig. 1.) Inspection of the drawings will show that simply moving the cutter-shaft end for end while the belt is untouched would be equivalent to crossing the belt of the shaft had it not been reversed; or, in other words, when one end of the cutter-shaft is up the cutter will revolve from right to left, and when the other end is up it will revolve from left to right. Moulding machines, as ordinarily made, have two cutter-shafts revolving in opposite directions. I have but one shaft, with cutters at each end, so that by simply revolving the shaft (which can be done without stopping the machine) I have a cutter revolving in either direction. I thus save nearly half the first cost of the machine and also nearly half the power required to run it.

My machine is much safer for the operator, as, in the common machine, the operator, while intently watching the working-cutter, is liable to allow his hand to come in contact with the second cutter.

When it is desirable I make this machine with the cutter-shaft hung above the table instead of under it, as shown in the drawing. In both the machines the principle is the same, that is, the cutter-shaft has cutters at each end, and is so hung that it may be turned end for end while the machine is in motion.

What I claim as my invention, and desire to secure by Letters Patent, is—

The combination of a cutter-shaft, having cutters at each end, with a device for turning it end for end, and thus, by crossing the band, giving the shaft a reverse motion, substantially as described and for the purpose set forth.

HENRY F. SHAW.

Witnesses:
WILLIAM EDSON,
FRANK C. PARKER.